United States Patent [19]

Nielsen et al.

[11] Patent Number: 4,587,631
[45] Date of Patent: May 6, 1986

[54] AUTOMATIC TEXT ADJUSTMENT

[75] Inventors: Robert C. Nielsen, Longmont, Colo.; John A. Aiken, Jr., Round Rock; Aubrey M. Herzik, Austin, both of Tex.

[73] Assignee: International Business Machines Corp., Armonk, N.Y.

[21] Appl. No.: 750,978

[22] Filed: Jul. 1, 1985

Related U.S. Application Data

[63] Continuation of Ser. No. 569,368, Apr. 9, 1984, abandoned, which is a continuation of Ser. No. 274,363, Jun. 16, 1981, abandoned.

[51] Int. Cl.⁴ .............................................. G06F 3/14
[52] U.S. Cl. .................................... 364/900; 364/521
[58] Field of Search ... 364/200 MS File, 900 MS File, 364/521; 400/64, 63, 1, 76, 279; 340/709

[56] References Cited

U.S. PATENT DOCUMENTS

| | | | |
|---|---|---|---|
| 3,764,986 | 10/1973 | Spademan et al. | 364/200 |
| 3,786,429 | 1/1974 | Goldman et al. | 364/900 |
| 3,837,459 | 9/1974 | Martin | 364/900 |
| 3,838,396 | 9/1974 | Martin | 364/900 |
| 3,940,746 | 2/1976 | Vittorelli | 364/900 |
| 3,974,493 | 8/1976 | De Cavaignac et al. | 340/709 |
| 4,057,849 | 11/1977 | Ying et al. | 364/200 |
| 4,207,011 | 6/1980 | Pascoe | 364/900 |
| 4,209,784 | 6/1980 | Sumner | 340/711 |
| 4,220,417 | 9/1980 | Sprott et al. | 364/900 |
| 4,357,680 | 11/1982 | Greek, Jr. et al. | 364/900 |

Primary Examiner—Eddie P. Chan
Attorney, Agent, or Firm—Harold E. Meier

[57] ABSTRACT

The specification discloses a method for adjusting text in a word processing system when the insert mode is completed. An indicator is set to indicate a change active condition if a change is made to the current line of text when an establish insert mode key is depressed by the operator. The indicator is interrogated to determine if a change active condition has been indicated when a terminate insert mode key is later depressed by the operator. When a change active condition is detected, the line end codes for the current line of text are adjusted to provide an adjusted line. The adjusted line is then interrogated to determine whether a paragraph boundary or page end code is included. If no paragraph boundary or page end code is included, the adjusted line is interrogated to determine whether a change was made in the line end code. Each succeeding line following the adjusted line is adjusted until a paragraph boundary or page end code is encountered or no change in the line end code is made for that line.

12 Claims, 12 Drawing Figures

AUTOMATIC TEXT ADJUSTMENT

DESCRIPTION

This is a continuation of application Ser. No. 569,368, filed Apr. 9, 1984, now abandoned, which is a continuation of application Ser. No. 274,363 now abandoned, filed June 16, 1981.

BACKGROUND OF THE INVENTION

1. Field of the Invention

The present invention pertains to word processing and more particularly to automatic adjustment of line ends in text during editing.

2. Description of Prior Art

Numerous word processing systems have been developed for editing and processing conventional alphanumeric text. Although some systems, such as the IBM Office System 6, have text adjustment features which can be explicitly invoked within a page, present systems do not permit automatic text adjustment during editing after each line of revisions. Accordingly, there is a need for an automatic text adjustment during editing which keeps text adjusted to the extent possible with minimum interference to the operator input.

SUMMARY OF THE INVENTION

According to the invention, a method for adjusting text during editing is provided. An indicator is set to indicate a change active condition if a change is made to the current line of text when an establish insert mode key is depressed by the operator. The indicator is interrogated to determine if a change active condition has been indicated when a terminate insert mode key is later depressed by the operator. When a change active condition is detected, the line end codes for the current line of text are adjusted to provide an adjusted line. The adjusted line is then interrogated to determine whether a paragraph boundary or page end code is included. If no paragraph boundary or page end code is included, the adjusting line is interrogated to determine whether a change was made in the line end code. Each succeeding line following the adjusted line is adjusted unless a paragraph boundary or page end code is encountered or no change was made in the line end code for that line.

BRIEF DESCRIPTION OF THE DRAWINGS

For a more complete understanding of the present invention and the advantages thereof, reference is now made to the following Description taken in conjunction with the accompanying Drawings in which.

DESCRIPTION OF THE BEST MODE

Figure 1:
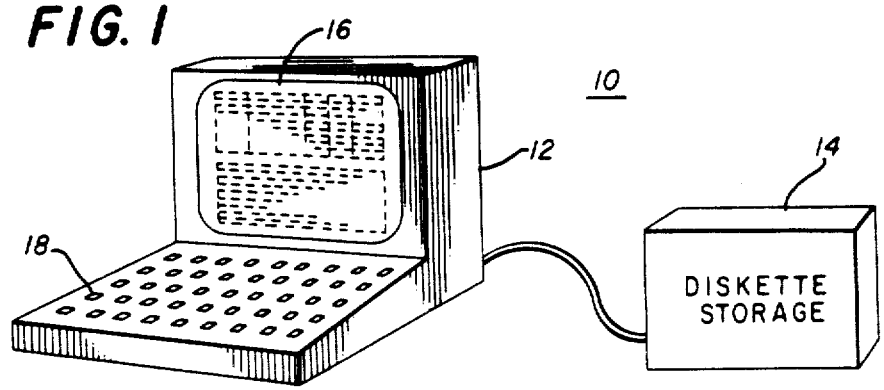
FIG. 1 is a perspective view illustrating a work station comprising a cathode ray tube display screen and a keyboard with a station connected to a main store consisting of a diskette storage unit.

The present invention provides a method for automatically adjusting previously keyed text during editing with minimal interference to the operator input and minimum interference to performance.

Text adjustment refers to the process of adding and deleting line end codes to provide relatively uniform line lengths within margins without changing the grammatical structure of the text. Insert mode refers to the mode in which changes are made to the text of a document stored in a storage media. As an aid to understanding the present invention, the keys in a word processing system may be classified into four categories. One category includes a set of keys which establish an insert mode upon entry and which effect adjustment of the data stream. These keys are called establish insert mode keys and include primarily the graphics, but also text format controls and function keys such as error backspace, required page end code, instruction, change format, enter and delete. When the establish insert mode keys are depressed, they signal that a change is being made to the current paragraph which may require automatic adjustment. The instruction, change format and delete in conjunction with the enter key establish insert mode only when the operation is successfully completed (not cancelled or invalid).

The second category involves keys which by their nature have no effect on the length of a line of text. These include, for example, the cursor right, cursor left, boundary right, boundary left, keyboard change, message, reply and all ignored or invalid keys. Since these keys cause no changes in the length of a line of text, no automatic adjustment is necessary. In fact, by not adjusting text when keys such as the cursor right, cursor left, boundary right or boundary left are depressed, an operator can make several corrections and cursor motions on a single line without initiating the adjustment process. If the lines were adjusted after each of these keystrokes, such adjustment would cause a delay in cursoring and result in multiple adjustments of a single line.

A third category includes keys which terminate the insert mode, but which do not execute the automatic adjust when entered by the operator. These keys may include, for example, the line adjust, get, move and copy keys. The line adjust permits the operator to manually go through a paragraph and adjust the text to make hyphenation decisions. The get, move and copy keys permit moving and copying of entire pages. No textual adjustment is made when these keys are depressed because the magnitude of the changes they effect makes automatic text adjustment on a line by line basis impractical. The text adjustment process of the present invention is limited to relatively small scale revisions within a single paragraph.

The fourth category of keys includes keys which indicate the insert mode has been terminated and which will cause the automatic adjust to be executed. These keys are called the terminate insert and execute keys. These keys normally imply movement off the line. Thus, the current line is adjusted only after all corrections on that line have been made. This category of keys includes the cursor up, cursor down, boundary up, boundary down, find, go to, print, page end, end and request keys. The cursor up and cursor down keys cause the cursor to be moved off the current line to the same horizontal position from the left margin one line above or below the current line. The boundary up and boundary down keys cause the cursor to be moved off the current line to the beginning of the top line and the end of the bottom line, respectively. The find and go to keys may take the cursor off the current line to another page or paragraph. The print and page end keys, by definition, move the cursor to the top of the next page. The end key signals the end of revision of the document. The request key allows interrupting the editing process temporarily to handle various printer conditions. Depressing one of the terminate insert and execute keys may indicate that a change has occurred or that a current revision has been completed which should be automatically adjusted.

Referring now to FIG. 1, there is illustrated an information processing system 10 which comprises a work station 12 connected to an auxiliary store which in this system is a diskette storage 14. The station 12 includes a display screen 16, which is typically a cathode ray tube. Station 12 further includes a keyboard 18 which has keys for entering alphanumeric characters, as well as predefined commands.

In operation, the operator enters commands through keyboard 18 to call up information which is stored in the diskette storage 14. An operator command may consist of one or more keystrokes. The information which is called up is displayed on screen 16 so that the operator can edit the displayed information to accomplish such tasks as entering new information, revising information, moving information from one location to another and deleting stored information. The operator also has the capability to manipulate the stored information to perform other operations, to select or modify records stored in the files in diskette storage 14. Thus, the operator has the capability of carrying out conventional word processing editing together with data base manipulations.

Figure 2:
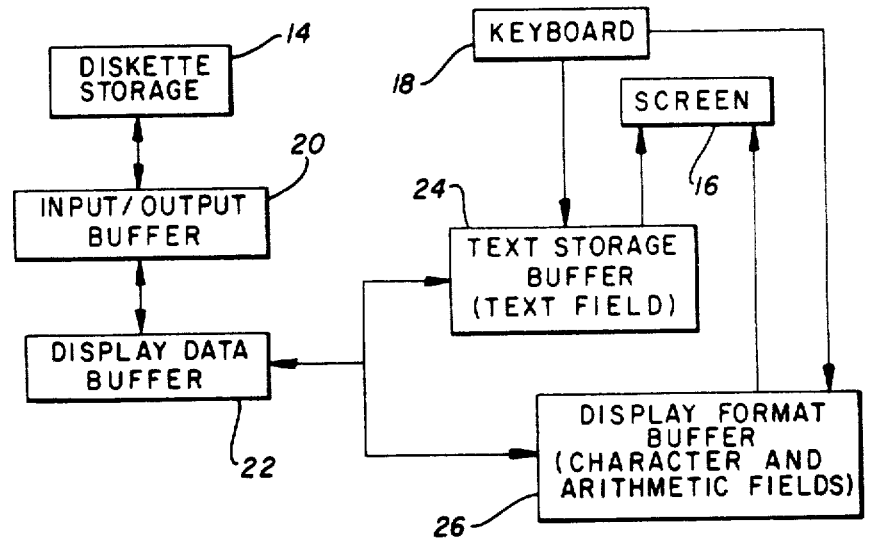
FIG. 2 is a block diagram of the functional units of the system illustrated in FIG. 1.

Referring to FIG. 2, there is illustrated a functional block diagram of the operational elements of the present system. The information flow is described as follows. An information file is stored in the diskette storage 14. The file is made up of a group of records. Each record consists of one or more character fields, arithmetic fields and text fields. A character field is defined as a group of primarily alphanumeric and punctuation characters and specifically excludes control characters such as line end and page end codes. An arithmetic field is defined as a field having numeric and limited punctuation characters and further including limited algebraic characters illustrating mathematical relationships. The arithmetic field does not include control characters. The text field is essentially the same as a character field but includes control characters. Control characters are utilized by the system 10 to indicate the nature and location of characters on the display screen 16. Typical control characters are line end codes, page end codes, tabs and carriage returns.

The operator enters a command into the work station 12 which causes the document to be read from storage 14. The document is transmitted to an input/output buffer 20 where it is temporarily stored. The record in buffer 20 is then transmitted to a display data buffer 22. The record in buffer 22 is transferred to a text storage buffer 24 and a display format buffer 26. The text field of a record is stored in text storage buffer 24. The arithmetic and character fields of a record are stored in buffer 26. The screen 16 displays the information stored in buffers 24 and 26.

The displayed record is edited by the operator entering commands and characters through keyboard 18 to alter the fields stored in buffers 24 and 26. After editing is completed, the text field in buffer 24 is returned to display data buffer 22 and incorporated therein. The edited fields in buffer 26 are likewise returned to buffer 22 and incorporated into the text therein. This produces an edited record which the operator can then cause to be transferred into the input/output buffer 20 for storage on the diskette storage 14.

Figure 3:
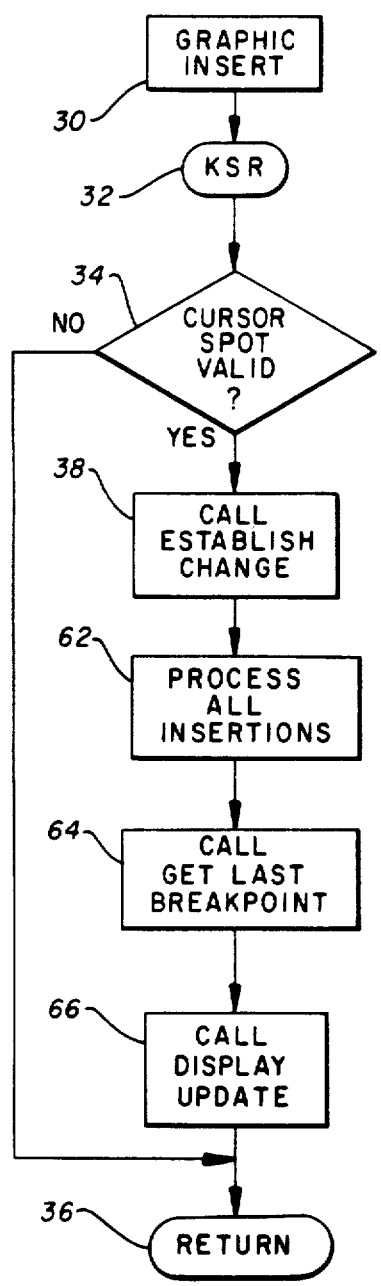
FIG. 3 is a logical flow chart for the keystroke service routine invoked when an established insert mode key, such as a graphic insert, is depressed.

Reference is now made to FIG. 3 which illustrates the logical flow of the keystroke service routine invoked by the keyboard distributor when one of the establish insert mode keys, such as a graphic insert, is depressed by the operator at 30. The appropriate keystroke service routine 32 for the particular establish insert mode key processes the keystrokes made by the operator. For keys such as the graphic insert, text format controls, error correct backspace and required page end code, the keystroke service routines invoked are essentially the same as shown in FIG. 3. Keys such as the instruction, change format and delete in conjunction with enter invoke different keystroke service routines, such as that shown in FIG. 10 and described below in greater detail.

At step 34, the keystroke service routine determines whether the cursor is in a valid position to make an insertion. If the cursor is not in a valid position, the routine is terminated at 36 and control is returned to the keyboard distributor with an appropriate message displayed to the operator. Thus, an invalid keystroke makes no change to the line of text, although one invalid keystroke on a line will not alter other valid keystrokes previously made on that line. The fact that a previous change has been made on the line will be remembered.

Figure 4:
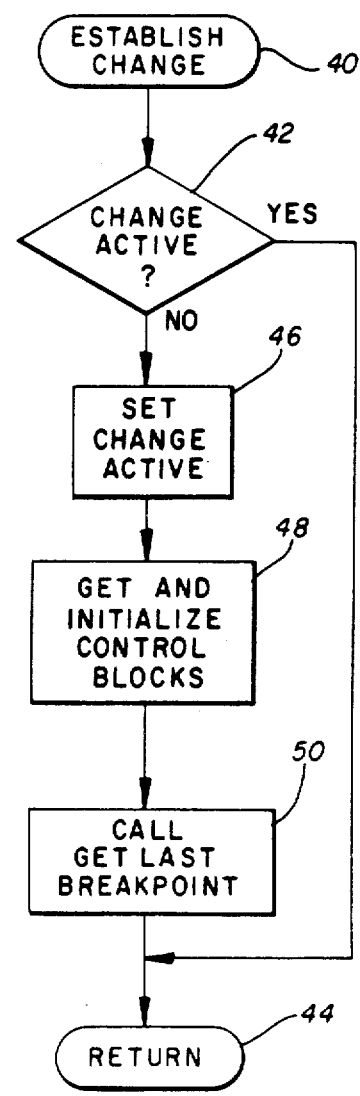
FIG. 4 is a logical flow chart for the Establish Change Subroutine.

If the cursor is in a valid position, then at step 38, Establish Change Subroutine 40 is called. FIG. 4 shows a logical flow chart for the Establish Change Subroutine 40.

Referring now to FIG. 4, the Establish Change Subroutine 40 samples the change active indicator at 42 to determine if an active change has already occurred on the current line. If so, the change active indicator will have already been set and the routine will be terminated at step 44 and control will be returned to the keystroke service routine 32. If this is the first valid change to occur on the current line, the change active indicator is set at 46. When the change active indicator is set, subroutine 40 requests, receives and initializes storage for the line adjust control blocks as indicated at step 48. The control blocks contain indicators, pointers and parameters used by the line adjust routine. At 50, the Get Last Breakpoint Subroutine 52 is called to find the last breakpoint prior to the cursor position.

Figure 5:
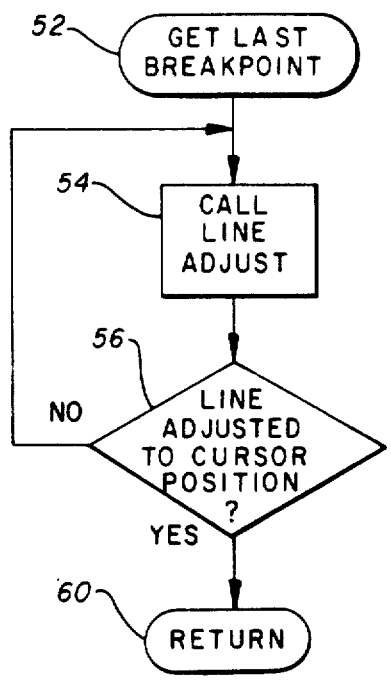
FIG. 5 is a logical flow chart for the Get Last Breakpoint Subroutine.

FIG. 5 illustrates the logic of Get Last Breakpoint Subroutine 52. Subroutine 52 insures that what is between the beginning of the line and the cursor position is not sufficient to make up a line by itself. If it is, the line is adjusted by inserting as many line end codes as necessary to break up the line. At 54, subroutine 52 calls the line adjust routine. The line adjust routine is a common service routine used for the automatic adjust, as well as for document pagination and the line adjust function. The line adjust routine will process from the beginning of the cursored line until a line end code is inserted or the cursor position is reached. A determination is made at step 56 whether the cursor position is reached. If not, the line adjust routine at 54 will be called by subroutine 52 until the determination is made at steps 56 that the cursor position is reached. After the current line is adjusted to the cursor position, control is returned at step 60 to the keystroke service routine 32 (FIG. 3).

Referring once again to FIG. 3, when control is returned to the keystroke service routine 32, all insertions made by the operator are processed at step 62. If the operator is several keystrokes ahead of the machine when keystroke service routine 32 is called for the first of those keystrokes, the routine will look ahead and see if any more changes are to be made and process all changes at once. This is done by putting all waiting insertion keystrokes into the text storage buffer 24 before they are put onto the diskette storage 14 or into display buffer 26.

When all insertions (changes) have been processed, the Get Last Breakpoint Subroutine 52 is again called at step 64 since the operator may have inserted enough characters to cause the cursor to move beyond the right margin. As previously described, the Get Last Breakpoint Subroutine will insert line end codes in the appropriate position and move the cursor down to the next line. Thus, whenever an automatic adjust is required, all lines above the current line will have been properly adjusted so that as the cursor goes down through the paragraph, only the current line and remaining lines in the paragraph may require adjustment.

In keystroke service routine 32, Get Last Breakpoint Subroutine 52 is called twice: the first time to establish the initial conditions of the line and the second time to adjust for new insertions and determine whether the revised line needs to be broken down into more than one line. Once it has been determined at step 56 that no more line end changes are required, the routine returns control to the keystroke service routine 32, which calls the display update program at 66 to cause the display to reflect the changes that have been made in the text storage buffer. The graphic insert keystroke service routine 32 is invoked every time the operator presses a graphic insert key.

Figure 6:
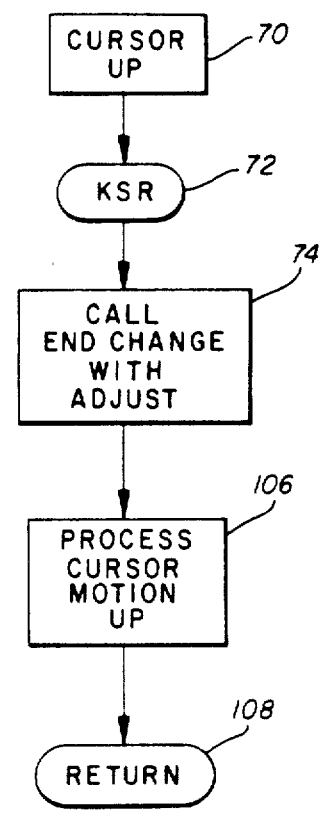
FIG. 6 is a logical flow chart for the keystroke service routine invoked when a terminate insert mode key, such as "cursor up", is depressed.

FIG. 6 illustrates the logical flow of the keystroke service routine which is invoked when a terminate insert execute key is depressed. Once a terminate insert execute key such as "cursor up" is depressed at step 70, a keystroke service routine 72 is invoked. This terminates the insert mode and executes the automatic line adjust. Essentially, the functional aspects of keystroke service routine 72 for the cursor up key are identical to other keys in the group such as, for example, cursor down, boundary up, boundary down, print, end and request. Routine 72 is similar, but not identical to the find and go to keys, which are described below in greater detail.

Figure 7:
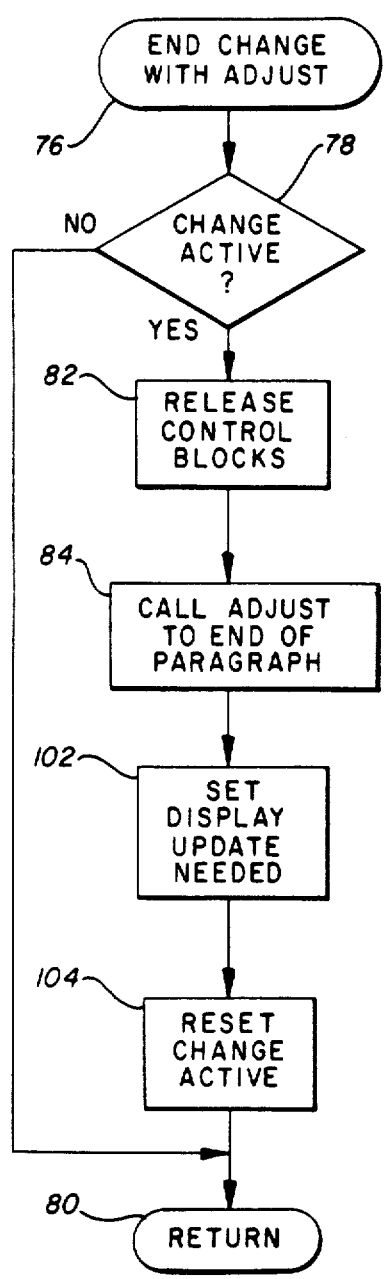
FIG. 7 is a logical flow chart for the End Change With Adjust Subroutine.

The appropriate keystroke service routine 72 is called up when the operator depresses a cursor up, cursor down or other terminate insert execute key. At step 74, the End Change With Adjust Subroutine 76 is called. FIG. 7 illustrates the logic of the flow chart of End Change With Adjust Subroutine 76. At step 78, the change active indicator is interrogated to determine if a change active condition exists. If not, no text adjustment is necessary and control may be returned to keystroke service routine 72 at step 80. If the change active indicator has been set, the next step 82 releases the line adjust control blocks. The next step 84 calls the Adjust to End of Paragraph Subroutine 86.

Figure 8:
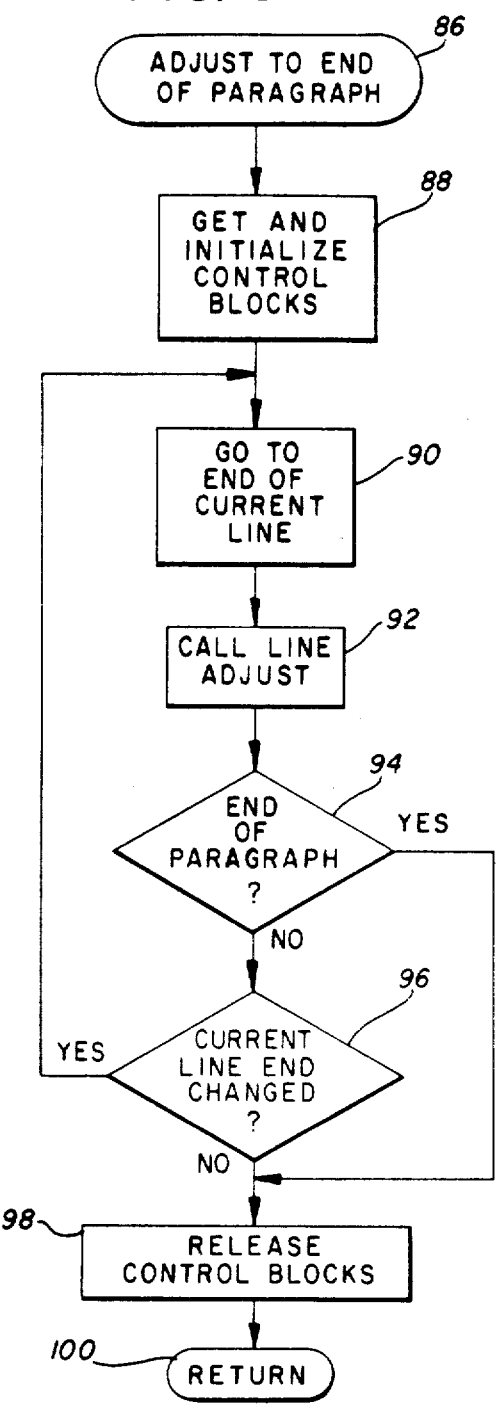
FIG. 8 is a logical flow chart for the Adjust To End of Paragraph Subroutine.

FIG. 8 is a flow chart for the Adjust to End of Paragraph Subroutine 86. At step 88, the routine requests, gets and initializes the line adjust control blocks. In the next step 90, subroutine 86 goes to the end of the current line (i.e., the next line end code) where the line adjust service routine is called at step 92. At decision step 94, a determination is made whether a paragraph boundary or page end code has been encountered. If a paragraph boundary or page end code has not been encountered, a determination is made at step 96 whether the current line end was changed. If so, the routine goes to the end of the current line, calls the line adjust routine and continues to recycle until either the end of the paragraph or a page end code is reached or the current line end is unchanged. At this point, the next step 98 releases the control blocks for the line adjust routine and control is returned at step 100 to the End Change With Adjust Subroutine 76.

Referring again to FIG. 7, the next step 102 in the End Change With Adjust Subroutine 76 is to set the Display Update Needed. This provides an indicator which signals that a future update should be a full update to include the results of the processing by End Change With Adjust Subroutine 76. At 104, the change active indicator is reset and control is returned at step 80 to the keystroke service routine 72.

Referring again to FIG. 6, which illustrates the logic of the keystroke service routine 72, the key function, cursor up, cursor down, boundary up, boundary down, print, end or request is next processed at step 106. The keystroke service routine 72 is then concluded at step 108 and control is returned to the keyboard distributor.

Figure 9:
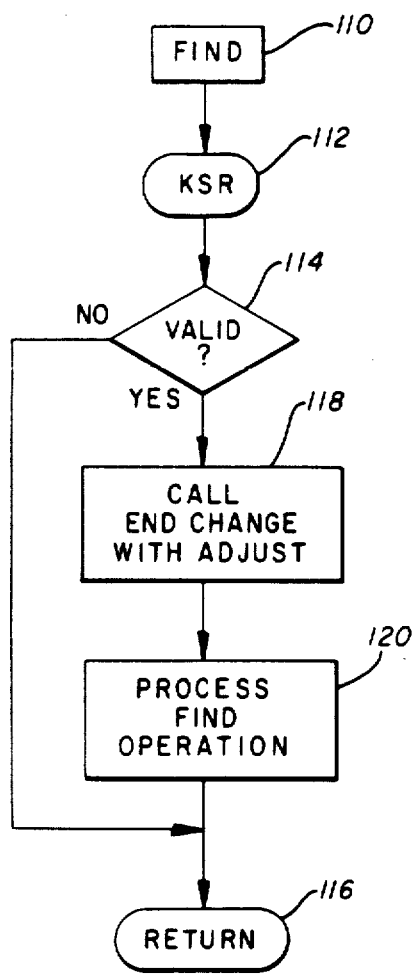
FIG. 9 is a logical flow chart for the keystroke service routine invoked when a terminate insert mode key, such as "find," is depressed.

FIG. 9 illustrates the functional steps of the find and go to keystroke service routines. These keystroke service routines are basically the same as the cursor up, cursor down, boundary up, boundary down, print, page end, end and request keystroke service routines with the exception that these routines are not processed for invalid operations. Referring to FIG. 9, when a find key is depressed at step 110, the keystroke service routine 112 for the find key is invoked. At step 114, a determination is made whether the operation is valid. If not, the routine is terminated at 116. If the operation is valid, the End Change With Adjust Subroutine 76 is called at step 118 and upon return of control from this subroutine, the find operation is processed at step 120. When the find operation is processed, the routine is terminated at 116 and control is returned to the keyboard distributor.

Figure 10:
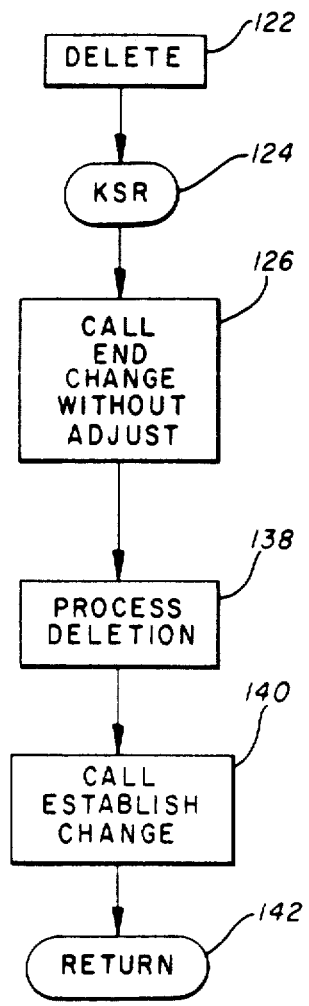
FIG. 10 is a logical flow chart for the keystroke service routine invoked when an establish insert mode key, such as "delete", is depressed.

Referring now to FIG. 10, the functional steps of the keystroke service routine for the delete key are illustrated. As earlier stated, the delete key (as well as the enter and change format keys) is somewhat atypical of the insert mode keys. The delete key causes a change in the current line which may encompass many lines and pages. When the delete key is depressed at step 122, the appropriate keystroke service routine 124 for the delete key is called up. When keystroke service routine 124 is called, the End Change Without Adjust Subroutine is called at step 126. The purpose of calling this routine is to reset the change active indicator if prior changes have occurred on the line prior to depressing the delete key.

Figure 11:
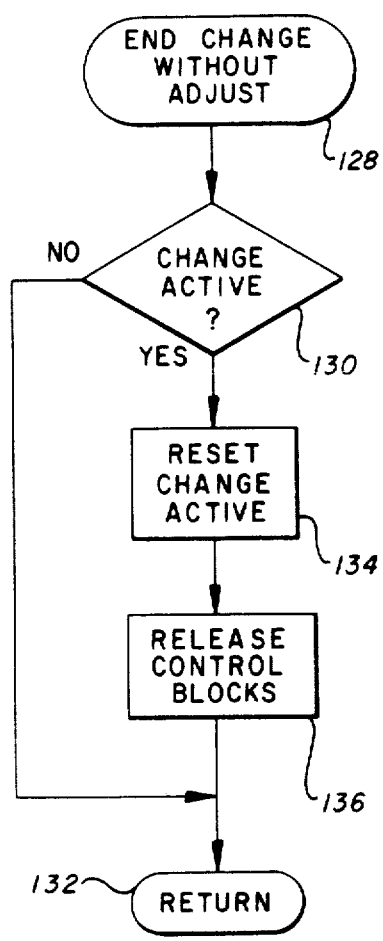
FIG. 11 is a logical flow chart for the End Change Without Adjust Subroutine.

FIG. 11 illustrates the logic of the End Change Without Adjust Subroutine 128. At step 130, the change active indicator is interrogated to determine whether a valid change has occurred on the current line. If no valid change has occurred, the End Change Without Adjust Subroutine 128 is terminated at 132 where control is returned to the delete keystroke service routine 124. If the change active indicator has been set, the indicator is reset at step 134 and the control blocks for the line adjust routine are released at step 136.

Referring again to FIG. 10, when control is returned from End Change Without Adjust Subroutine 128, the specified deletion is then processed at 138. At step 140, the Establish Change Subroutine 40 is called since the processing of the delete function requires adjustment of the line at which deletion ends. Subroutine 40 is processed as previously described. The control blocks for the line adjust routine are initialized and the Get Last Breakpoint Subroutine 52 is called. Since the change active indicator was reset in step 134, these steps will automatically occur. When control has been returned from Establish Change Subroutine 40, the delete keystroke service routine 124 is completed and control is transferred back to the keyboard distributor at step 142. The instruction and change format keys in conjunction with the enter key invoke keystroke service routines following the same logic as the delete key.

Figure 12:
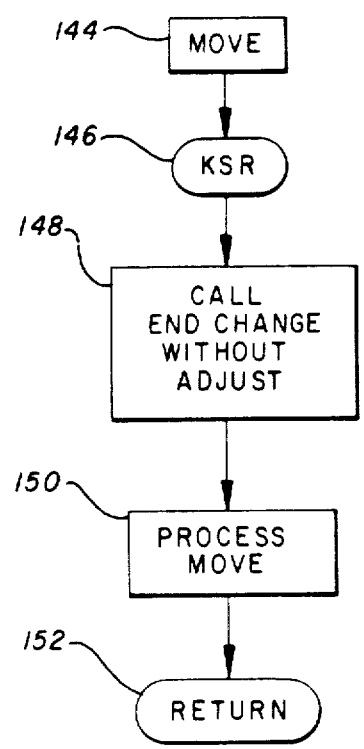
FIG. 12 is a logical flow chart for the keystroke service routine invoked when a terminate insert mode key, such as "move", is depressed.

FIG. 12 illustrates the logical flow chart of a keystroke service routine for the move key, which is typical of the other terminate insert mode without execution keys. When a move key is depressed at step 144, the appropriate keystroke service routine 146 is called. Since these keys normally invoke massive changes which are more efficiently processed through other modes, the line adjust routine is not invoked. At step 148, the End Change Without Adjust Subroutine 128 is called. This subroutine, as previously mentioned, resets the change active indicator and releases control blocks for the line adjust routine. When control is returned to keystroke service routine 146, the move function is processed at step 150 and the routine is then terminated at step 152.

It can thus be seen that the present invention provides a method for efficiently adjusting text during the editing or insert mode in word processing.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

We claim:

1. A method for automatically adjusting a paragraph of text in a word processing system on a line-by-line basis during editing, the text formed in a data stream, comprising the steps of:
    (a) depressing an establish insert mode key during editing to establish an insert mode and set an indicator to indicate a change active condition when a change is made to a current line of text being edited and an active change has not already occurred on the current line
    (b) determining positively or negatively whether an operation associated with a specified terminate insert mode key is valid when said specified terminate insert mode key is depressed to terminate said insert mode and simultaneously cause a cursor to move off the current line;
    (c) if the specified terminate insert mode key has been depressed to thereby cause the cursor to move off the current line and the operation is valid, interrogating said indicator to determine if a change active condition has been indicated in step (a);
    (d) adjusting a position of a lind end code in the data stream for the current line of text to provide an adjusted line, when a change active condition is detected in step (c);
    (e) interrogating said adjusted line of step (d) to determine positively or negatively whether said adjusted line includes a paragraph boundary or page end code in the data stream;
    (f) interrogating said adjusted line of step (d) to determine positively or negatively whether said adjusted line requires a change in position of its line end code in the data stream, when the result of the interrogation in step (e) is negative;
    (g) adjusting a position of a line end code in the data stream for a line following said adjusted line, when the result of the interrogation in step (f) is positive; and
    (h) repeating steps (e)–(g) until either the result of the interrogation in step (e) is positive or the result of the interrogation in both steps (e) and (f) is negative.

2. The method of claim 1 wherein said specified terminate insert mode key is a cursor up key.

3. The method of claim 1 wherein said specified terminate insert mode key is a cursor down key.

4. The method of claim 1 wherein said specified terminate insert mode key is a boundary up key.

5. The method of claim 1 wherein said specified terminate insert mode key is a boundary down key.

6. The method of claim 1 wherein said specified terminate insert mode key is a print key.

7. The method of claim 1 wherein said specified terminate insert mode key is a request key.

8. The method of claim 1 wherein said specified terminate insert mode key is a page end key.

9. The method of claim 1 wherein said specified terminate insert mode key is a end key.

10. The method of claim 1 wherein said specified terminate insert mode key is a find key.

11. The method of claim 1 wherein said specified terminate insert mode key is a go to key.

12. A method for automatically adjusting a paragraph of text in a word processing system on a line-by-line basis during editing, the text formed in a data stream, comprising the steps of:
    (a) depressing a delete key to delete text on a current line of text being edited;
    (b) interrogating a change active indicator to determine positively or negatively whether changes have previously been made on the current line before the delete key was depressed in step (a);
    (c) if changes have previously been made on the current line, resetting said indicator;

(d) deleting the text specified for deletion on the current line to thereby cause a change on the current line which set the change active indicator;

(e) determining positively or negatively whether an operation associated with a specified terminate insert mode key is valid when said terminate insert mode key is depressed to simultaneously cause a cursor to move off the current line;

(f) if the specified terminate insert mode key has been depressed to thereby cause the cursor to move off the current line and the operation is valid, interrogating the indicator to determine if a change active condition has been indicated;

(g) adjusting a position of a line end code in the data stream for the current line of text to provide an adjusted line, when a change active condition is detected in step (f);

(h) interrogating said adjusted line of step (g) to determine positively or negatively whether said adjusted line includes a paragraph boundary or a page end code;

(i) interrogating said adjusted line of step (h) to determine positively or negatively whether said adjusted line requires a change in position of its line end code in the data stream, when the result of the interrogation in step (h) is negative;

(j) adjusting a position of a line end code in the data stream for a line following said adjusted line, when the result of the interrogation in step (i) is positive; and (k) repeating steps (h)–(j) until either the result of the interrogation in step (h) is positive or the result of the interrogation in both steps (h) and (i) is negative.

* * * * *